Oct. 18, 1955             L. PFOST           2,720,799
PROCESS FOR MOLDING A WRENCH AND HARD-METAL
INSERT USED THEREIN
Filed July 26, 1954

Inventor
Leland Pfost
By Howard M Herriot
Attorney

United States Patent Office 2,720,799
Patented Oct. 18, 1955

2,720,799

PROCESS FOR MOLDING A WRENCH AND HARD-METAL INSERT USED THEREIN

Leland Pfost, Kenosha, Wis.

Application July 26, 1954, Serial No. 445,559

2 Claims. (Cl. 76—114)

My invention relates to wrenches having an insert member in the wrench head portion thereof and to processes of making the same.

Wrenches cast completely of comparatively soft metal, such as certain aluminum alloys, are presently known and widely used, and are especially desirable for use in connection with dairy equipment because of their resistance to corrosion, their clean appearance and their light weight.

A disadvantage of such wrenches is that the jaws wear quite rapidly on the inside thereof where they bear against the nut during the turning of a nut. Another disadvantage is that the wrenches chip and break quite easily along the outside of the jaws when the wrench is used as a hammer for pounding or hammering the nuts to loosen any nuts which may be tight due to corrosion or dirt.

I have discovered, in connection with this invention, that these disadvantages are overcome by providing a wrench having an insert member of comparatively hard metal secured in the wrench head portion of a principal member of comparatively soft metal.

An object of my invention is to provide a wrench head insert member having holes therethrough and having grooves in the surface thereof joining the holes. Another object is to provide a wrench casting process utilizing such an insert member.

Objects and advantages other than those enumerated above will be apparent from the following specification when read in conjunction with the accompanying drawing, in which.

Figures 1, 2, 3, 4:
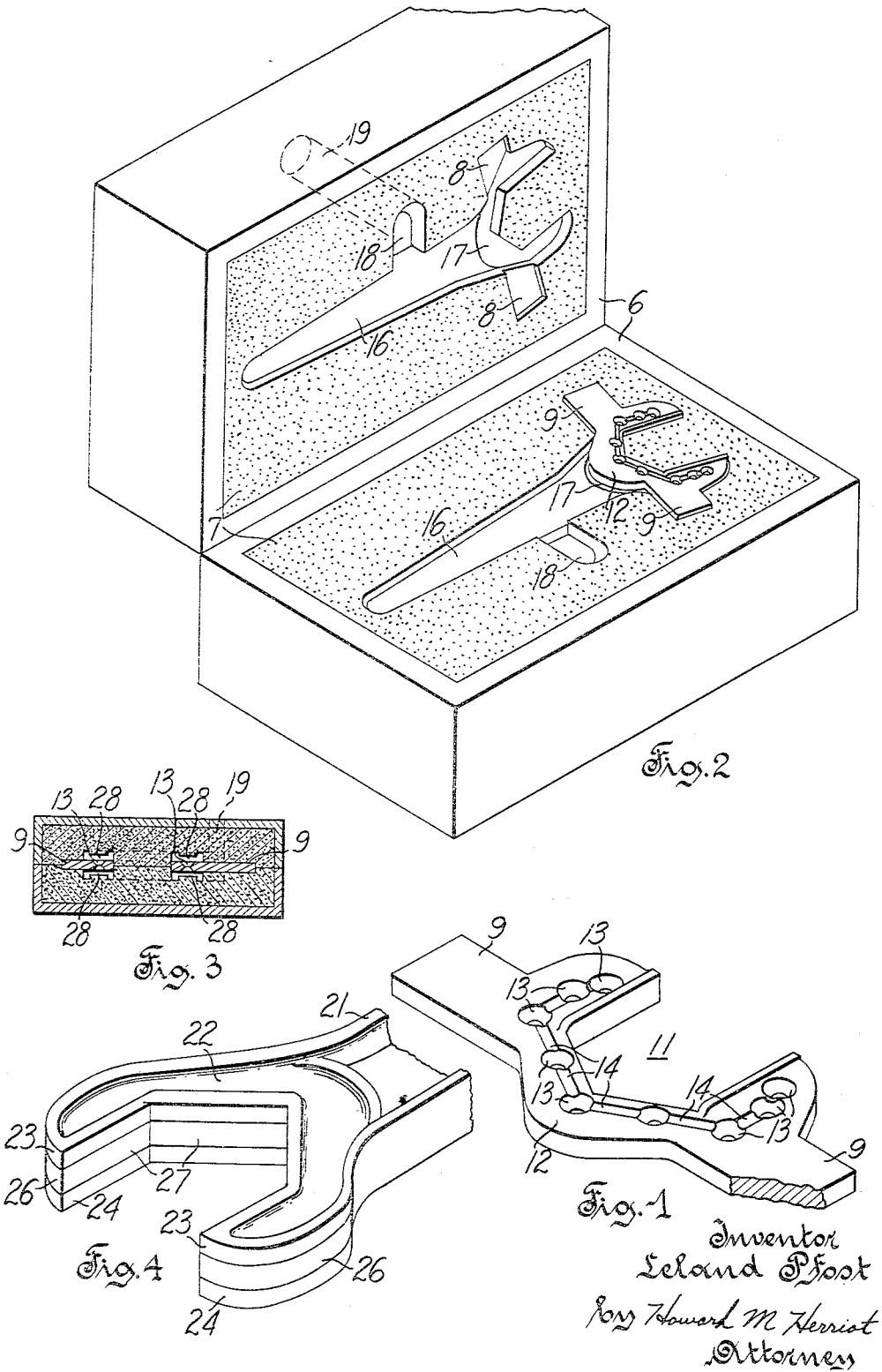
Fig. 1 is an isometric view of an insert member.
Fig. 2 is an isometric view of a molding device suitable for use in practicing the invention and having placed therein the insert member shown in Fig. 1.
Fig. 3 is a cross sectional view of the molding device shown in Fig. 2, but the device is shown in closed condition and is drawn on a reduced scale, said insert member being shown in position for the molding operation.
Fig. 4 is an isomeric view illustrating a wrench incorporating said insert member and made by the process of my invention.

Referring to the drawing, there is shown an open molding box 6 containing a sand mold 7 defining a wrench cavity therein having handle portion cavities 16 and wrench head portion cavities 17. The mold also has defined therein receiving cavities 8 which receive spacing pieces 9 of an insert member 11 when the insert member is placed in the mold. Receiving cavities 8 do not extend as deep into the mold as do the other cavities so that when insert member 11 is placed in the mold, the main portion 12 of the insert member is spaced apart from the defining sides of the mold. The receiving cavities 8 are shown with a depth one-half the thickness of the spacing pieces 9 so that with the insert member placed in the mold and the molding box closed, the spacing pieces 9 completely fill receiving cavities 8.

The mold 7 also has therein a runner 18 and a sprue 19 providing means for casting metal into the wrench cavity of the mold. The size of the remaining cavity space in the mold after the insert member has been placed therein, is large relative to the size of the insert member.

Insert member 11 is of comparatively hard metal having a greater wear resistance than the soft metal used to cast the principal member of the wrench. The insert member has a main portion 12 shaped like the head of the wrench defined by the mold. Any suitable spacing means such as the spacing pieces 9 project from the main portion 12. The main portion has openings 13 therethrough and grooves 14 in the surface thereof joining the openings 13.

To make the wrench herein described, the insert member 11 is placed in the mold with the spacing pieces 9 engaged in the receiving cavities 8. The insert member is thus supported in the mold with the main portion 12 of the insert member spaced from the sides of the mold cavities 17. A comparatively soft metal, in a moulten state, is poured into the mold to cast the principal member of the wrench. The moulten soft metal flows through sprue 19 and runner 18 to fill cavities 16 to form the handle portion of the principal member. The moulten metal also enters the cavities 17 to fill the spaces 28 between the insert member and the sides of the mold to form the wrench head portion having layers 23, 24. The moulten soft metal also flows into and fills the grooves 14 in the surface of the insert member and flows through and fills the openings 13 to connect the layers 23, 24 to lockingly secure the insert member between the layers. Because the principal member is large relative to the insert member, the quantity of the hot moulten metal is great as compared to the quantity of the cold insert metal and thus no chilling difficulties arise. The moulten metal therefore flows freely throughout the mold completely filling all the empty space therein including the space in the openings 13 and the grooves 14 of the insert member. The openings 13 in the insert member provide means for the moulten metal to make an integral connection between the two layers, so that upon cooling, the insert member is securely locked between the layers. The openings also provide edges which enable the moulten metal to fuse well with the insert member. The grooves 14 facilitate the flow of the moulten metal between and through the openings 13 and also provide edges at which the moulten metal fuses well with the insert member.

After cooling, the casting is removed from the mold, the sprue metal and the runner metal are cut off, and the projecting pieces 9 are cut off flush with the wrench head portion to complete the wrench.

The wrench made by the process herein described is illustrated in Fig. 4. The wrench has a principal member of comparatively soft metal having a handle portion 21 and a wrench head portion 22. The wrench head portion 22 has a pair of layers 23 and 24 with the hard metal insert member 11 secured tightly therebetween. The wrench head therefore has a hard metal bearing surface both on the inside of the jaws as at 27 and on the outside of the jaws as at 26. The wrench therefore may be used to hammer nuts loose without breaking or chipping the jaws of the wrench head. The wearing quality of the nut turning bearing surfaces of the jaws is also greatly improved.

Embodiments or modifications other than those shown and described herein may be made without departing from the function of my invention or from the scope of the appended claims.

It is claimed and desired to secure by Letters Patent:

1. The process of making a wrench comprising: providing a mold defining a wrench; providing a relatively small insert member of comparatively hard metal having a main portion and a pair of spacing pieces projecting from opposite sides of said main portion; providing said main portion with openings therethrough;

providing in the surface of said main portion grooves joining said openings; placing said insert member in said mold with said main portion spaced apart from the sides of said mold by said pieces; and casting a relatively large principal member of comparatively soft metal to fill all of the remaining space in said mold and to flow into said grooves and through said openings for lockingly securing said members together.

2. A wrench head insert member for placing in a mold prior to casting a principal member in said mold to form a wrench having said members lockingly secured together, said insert member comprising a main portion having openings therethrough and grooves in the surface thereof joining said openings, and spacing means projecting from said main portion for spacing said main portion apart from the sides of said mold when said insert member is placed in said mold to allow said principal member to extend into said grooves, through said openings and into the space between said main portion and the sides of said mold.

References Cited in the file of this patent

UNITED STATES PATENTS

| | | |
|---|---|---|
| 2,293,866 | Talch | Aug. 25, 1942 |
| 2,680,984 | Ingwer | June 15, 1954 |

FOREIGN PATENTS

| | | |
|---|---|---|
| 613,155 | Great Britain | Nov. 23, 1948 |